R. E. FRYE.
Trumpets for Railway-Heads, &c.

No. 146,816. Patented Jan. 27, 1874.

UNITED STATES PATENT OFFICE.

RICHARD E. FRYE, OF MANCHESTER, NEW HAMPSHIRE.

IMPROVEMENT IN TRUMPETS FOR RAILWAY-HEADS, &c.

Specification forming part of Letters Patent No. 146,816, dated January 27, 1874; application filed December 6, 1873.

*To all whom it may concern:*

Be it known that I, RICHARD E. FRYE, of Manchester, in the county of Hillsborough and State of New Hampshire, have invented a new and Improved Trumpet for Drawing-Frames; and I do hereby declare that the following is a full, clear, and exact description of the same, reference being had to the accompanying drawing forming a part of this specification.

The invention consists in improving the trumpets of railway-heads, hereinafter described and claimed.

Figure 1:
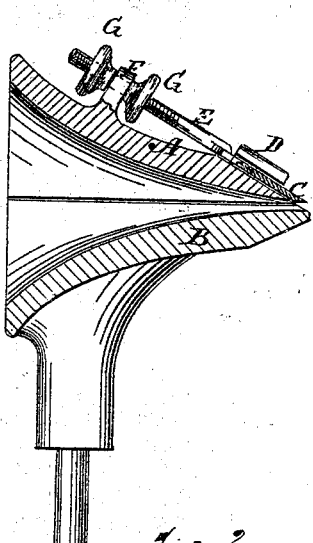
Figure 2:
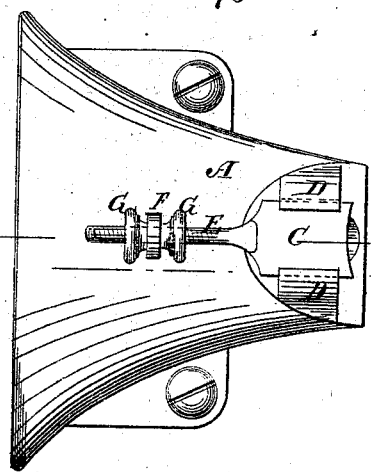

Figure 1 is a sectional elevation of a railway-trumpet constructed according to my invention, and Fig. 2 is a plan view.

A and B represent the two parts of the trumpet, which I construct in the ordinary manner, except that I bevel the upper part to the lower side of the mouth, and arrange a slide gate or valve, C, under clips or guides D forward and back over the beveled part, to expand or contract the mouth, as may be required, the upper wall of the mouth being formed in the end of the slide. To adjust and secure the slide, I provide it with a screw-threaded rod, E, passing through an eye-stud, F, on the top of the trumpet, and having adjusting and binding nuts G arranged on each side of the stud.

Having thus described my invention, what I claim as new, and desire to secure by Letters Patent, is—

The slide-gate C arranged on an incline, and provided with the threaded rod E and the nuts G G, in combination with a trumpet having an eye-stud, F, as and for the purpose described.

RICHARD E. FRYE.

Witnesses:
  CYRUS P. TRICKEY,
  CHARLES E. KNIGHT.